Dec. 19, 1933.  H. G. TAYLOR  1,939,734

CHAIN LINK AND METHOD OF MAKING THE SAME

Filed May 2, 1931

Humphrey George Taylor,
Inventor
by
Lester L. Sargent
Atty.

Patented Dec. 19, 1933

1,939,734

UNITED STATES PATENT OFFICE 1,939,734

CHAIN LINK AND METHOD OF MAKING THE SAME

Humphrey George Taylor, Penn, near Wolverhampton, England

Application May 2, 1931, Serial No. 534,632, and in Great Britain May 13, 1930

3 Claims. (Cl. 59—35)

The invention relates to wrought metal chain links and more especially to links of chain cables, but is applicable to other chain links of a like character, and has for its object to construct a wrought link which is cheap in manufacture, of strong construction and which has its stud a solid part therewith.

Several embodiments of the invention are described with reference to the drawing herewith of which:—

Figure 3 shows a modification somewhat similar to Figure 2.

Figure 1:
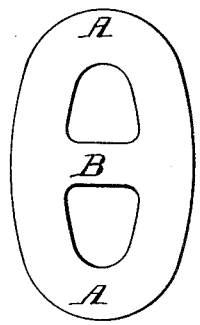
Figure 1 is a view of a link in its completed form.
Figure 2:
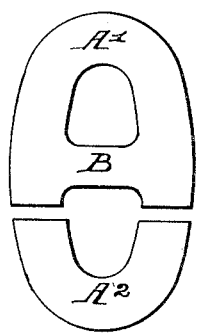
Fig. 2 shows the parts from which the link is welded up according to one form of the invention, such parts comprising two end pieces of U-form, and a stud formed integrally with one end.

Referring first to Figures 1 and 2, $A^1$ $A^2$ are the two end portions of the link and B the stud, the one end portion $A^1$ being formed integrally with the stud B, the other end portion $A^2$ being afterwards electrically welded to the stud.

Referring to Figure 3, the construction is similar to Figure 2 except that the free side of the stud B is straight and that the ends of the end portion $A^2$ are splayed inward at $a'$.

Having fully described my invention what I claim and desire to secure by Letters Patent is:—

1. A method of forming a link for a chain cable, said method consisting in first forming the link in two parts, one of the parts consisting of a U-shaped loop and the other part consisting of a U-shaped loop with a transverse stud, bringing the ends of the respective loops together, and electrically welding same into an integral chain link.

2. A process of electrically welding links for a chain cable, consisting in forming two end portions of U-form, one of said end portions having a transverse stud disposed and formed between the end portions thereof, bringing the end surfaces of the aforesaid portions of U-form into immediate contact, and flash welding same.

3. An electrically welded link for a chain cable, having two end portions of U-form and a transverse stud integral with one of said end portions and extending over the entire end surfaces of the other of said end portions of U-form, said end portions being connected together by welding through the medium of said stud, the end portion without the stud having its ends widened at their end surfaces to give an increased area of welding surfaces.

HUMPHREY GEORGE TAYLOR.